T. B. FUNK.
TRACTOR CULTIVATOR AND THE LIKE.
APPLICATION FILED MAR. 17, 1913.
1,189,207.
Patented June 27, 1916.
5 SHEETS—SHEET 1.
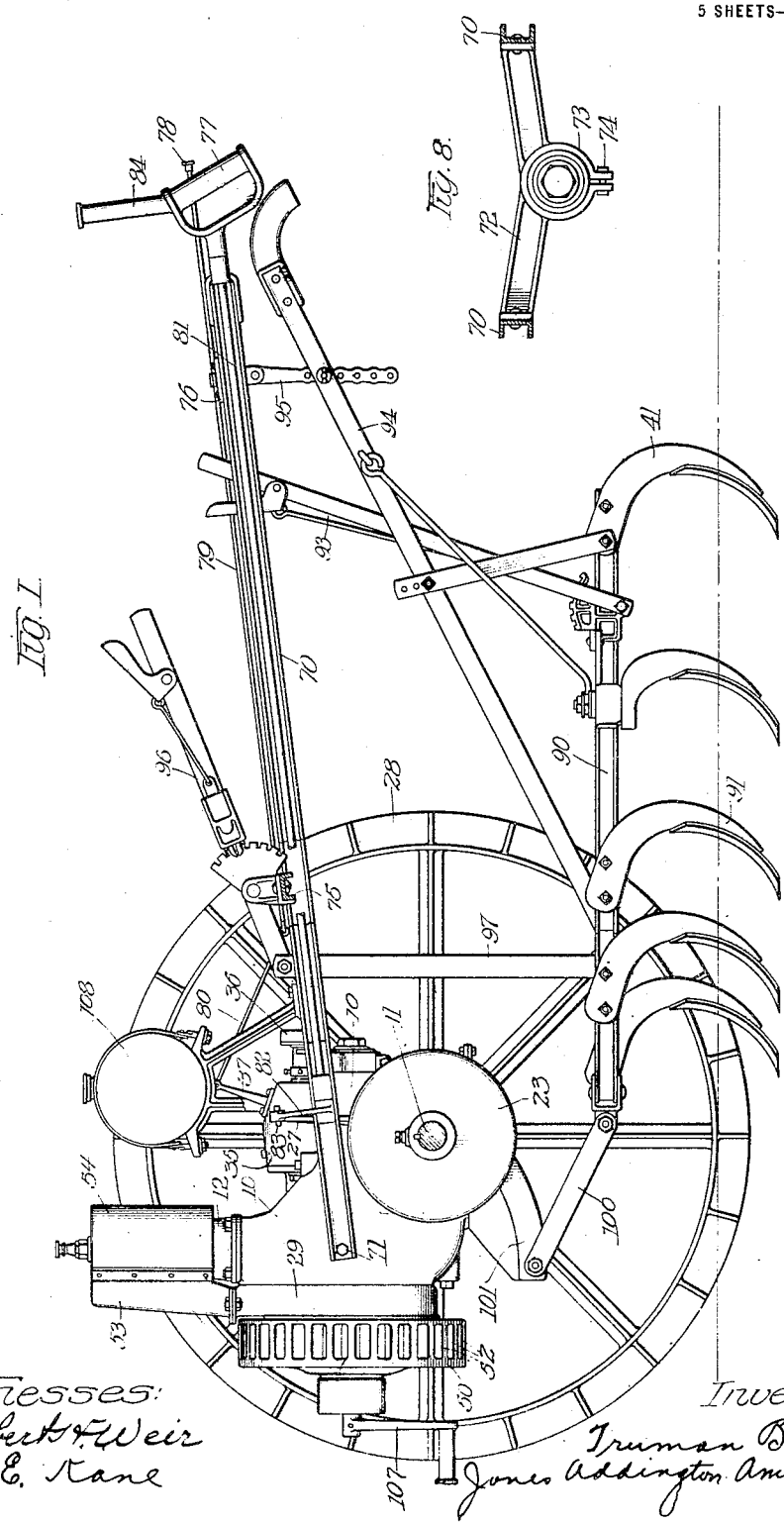

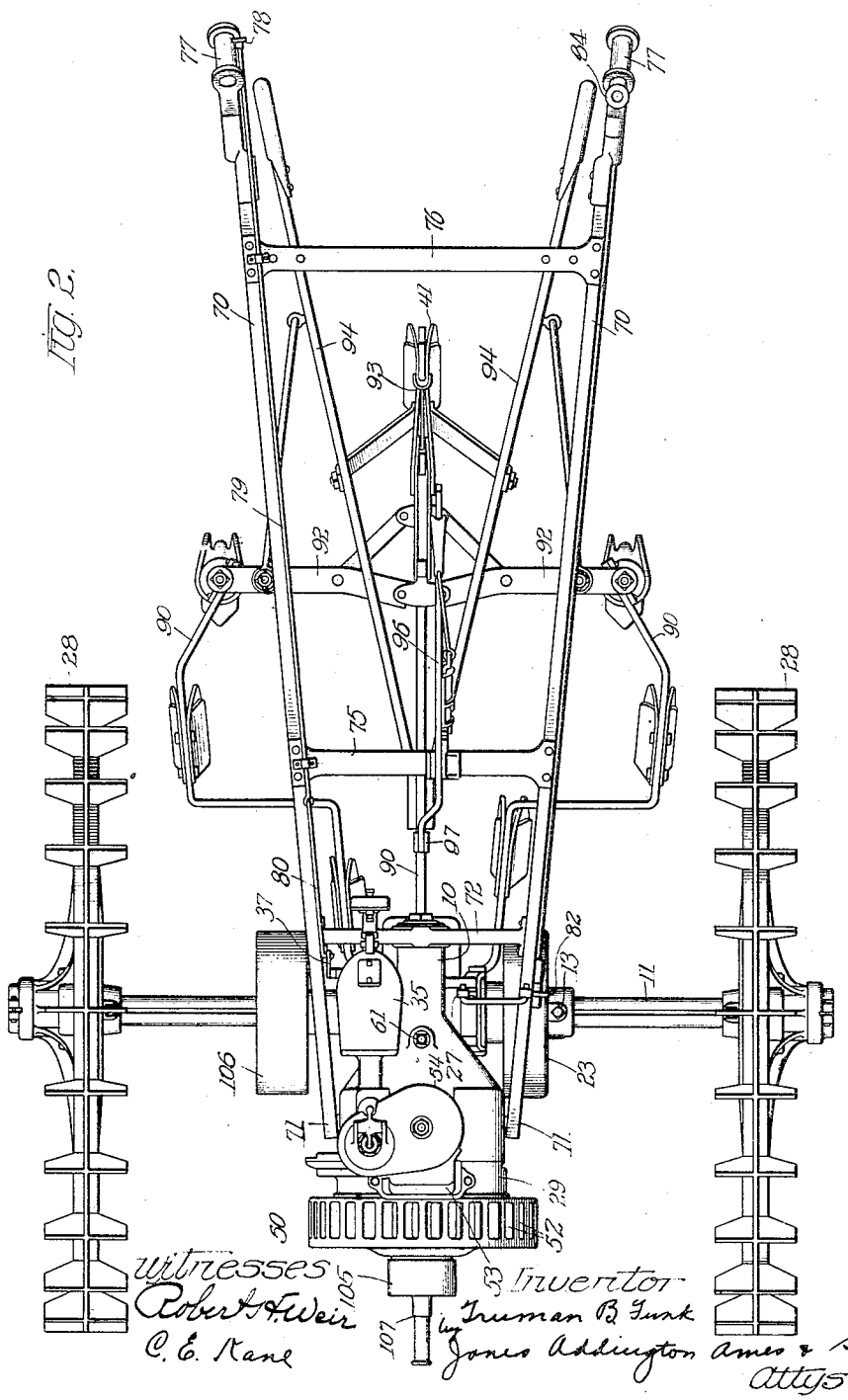

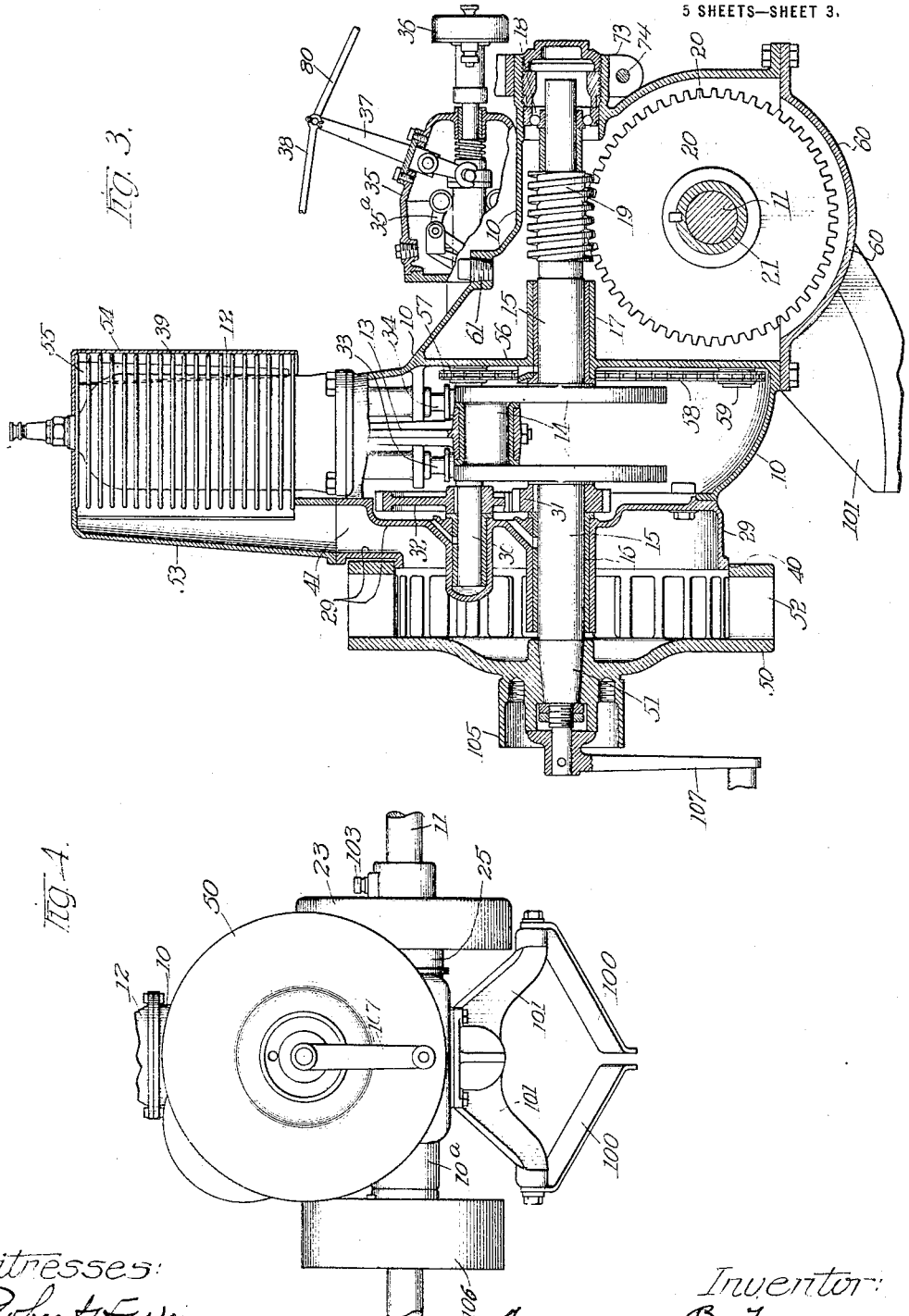

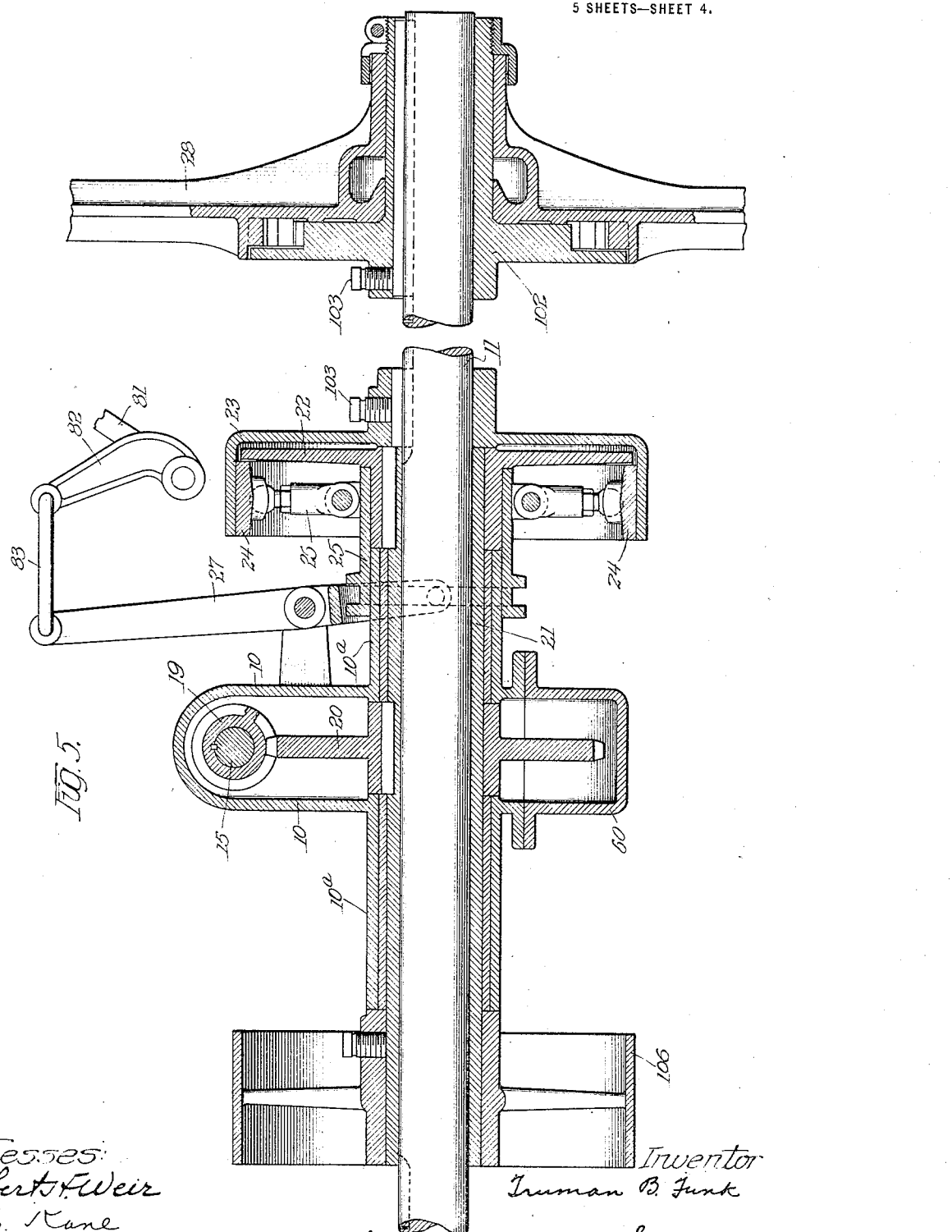

T. B. FUNK.
TRACTOR CULTIVATOR AND THE LIKE.
APPLICATION FILED MAR. 17, 1913.
1,189,207.
Patented June 27, 1916.
5 SHEETS—SHEET 5.
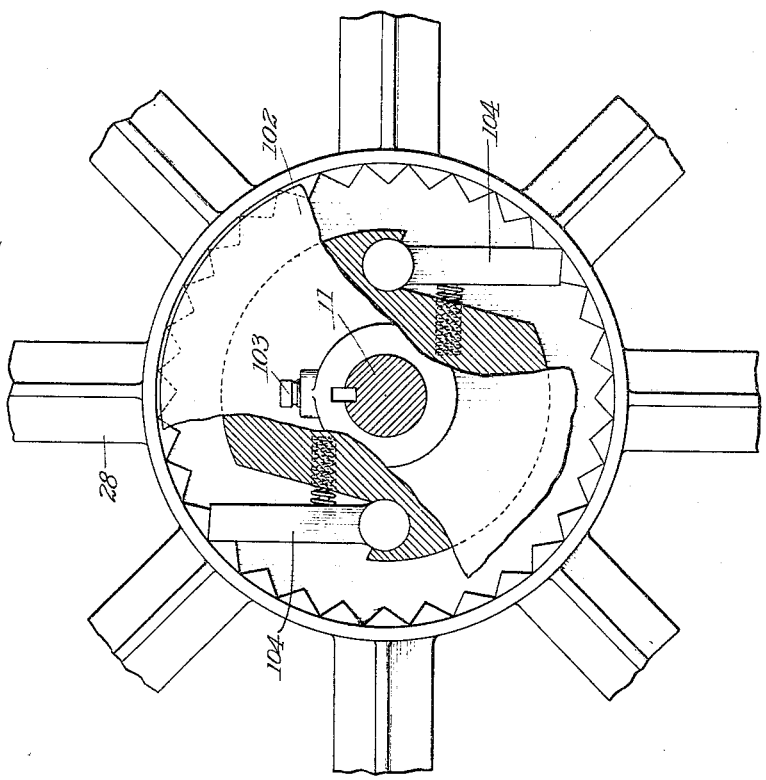
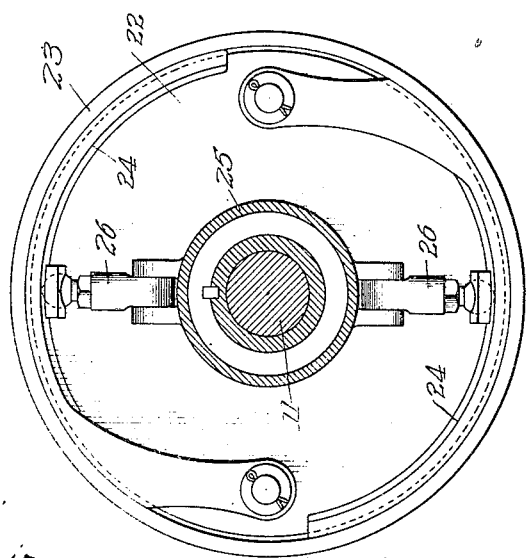
Witnesses:
Roberts Weir
C. E. Kane
Inventor
Truman B. Funk
Jones Addington Ames & Seibold
Attys

UNITED STATES PATENT OFFICE.

TRUMAN B. FUNK, OF NEWCASTLE, INDIANA.

TRACTOR-CULTIVATOR AND THE LIKE.

1,189,207.

Specification of Letters Patent.

Patented June 27, 1916.

Application filed March 17, 1913. Serial No. 754,792.

*To all whom it may concern:*

Be it known that I, TRUMAN B. FUNK, a citizen of the United States, residing at Newcastle, in the county of Henry and State of Indiana, have invented new and useful Improvements in Tractor-Cultivators and the like, of which the following is a full, clear, concise, and exact description, reference being had to the accompanying drawing, forming a part of this specification.

My invention relates to tractor cultivators and the like.

In general, my object is to provide a tractor for the purposes specified which is comparatively light in weight, strong, durable and of ample power for the purpose, and which is simple, convenient and easy to control and efficient in operation.

In carrying out my invention, provision is made whereby any ordinary cultivator or other implement of that general type may be used without necessitating substantial change or alteration therein. The constituent parts of the tractor are so constructed, combined and arranged that a balanced effect is obtained when the machine is being used, and a minimum amount of work is imposed upon the driver or operator. Provision is likewise made for conveniently and fully controlling the machine from the driving or operating position. Means are also provided whereby the tractor may be readily moved about, turned around or drawn back by hand without hindrance and without operating the engine or transmission mechanism. The motor is also preferably provided with high and slow speed belt pulleys, whereby it may be used as a stationary engine for driving machinery. In addition, the whole apparatus is small and compact and can be handled in a limited space; it is inexpensive to manufacture, maintain and operate, and therefore is especially adapted for the smaller farmers, truck gardeners and the like.

Other advantages and objects will appear from the detailed description and claims.

In the accompanying drawings one embodiment of the invention is shown, although it will be understood that it may take various forms.

In these drawings—Figure 1 is a side elevation of the tractor cultivator; Fig. 2 is a plan view of the same; Fig. 3 is a sectional view taken through the axis of the crank shaft of the engine or motor; Fig. 4 is a forward end elevation, parts being omitted, but showing particularly the attaching means for the forward end of the cultivator; Fig. 5 is a cross-sectional view through the axis of the driving axle shaft of the machine; Fig. 6 is a detailed view of the pawl and ratchet mechanism in the hub of the driving wheels, whereby said wheels may rotate in one direction independently of the axle shaft; Fig. 7 is a detailed view of the clutch for connecting the transmission and driving mechanism with the axle shaft; and Fig. 8 (Sheet 1) is a detail showing the method of connecting one of the cross braces of the handles to the main casting.

Referring to these drawings, the machine comprises, generally, a pair of supporting and driving or tractor wheels mounted upon the opposite ends of an axle shaft which carries the engine or motor and associated parts and serves to drive said wheels. The engine or motor, which is preferably a single cylinder gasolene or similar motor, is mounted forward of the axle shaft and transmits its power through suitable mechanism to said axle shaft to drive said wheels.

In order to steer the machine, a pair of steering bars, suitably braced together to form a rigid construction, are firmly secured to the body of the machine and extend some distance rearwardly of the axle. The cultivator or other implement is swung beneath the axle and steering bars, suitable provision being made for raising and lowering the same, and is guided and controlled through the medium of said handle bars. Provision is also made for controlling the throttle and clutch from the handles of the steering bars and without releasing the grip of the hands on said handles. The operator while in working position and with a hand gripping each handle has complete control over the machine. From this position he is enabled to start and stop, to vary the speed, to steer the machine, to pull it back, to turn it around, and in fact do all that is necessary or desirable in the control and operation of a machine of this character.

More specifically described, the body of the machine comprises a main casting 10 forming the crank case of the engine and inclosing the transmission or driving gears and other working parts of the machine, and serving to rigidly connect the parts together into a complete unitary structure. This casting is supported near the rear end on the axle-shaft 11 of the machine in suitable bearings later to be described. At its opposite end on the upper side the cylinder 12 of the engine is bolted. The connecting rod 13 (Fig. 3) of the engine is connected at its lower end with the crank 14 of the crank shaft 15 which is supported in suitable bearings 16, 17 and 18, the latter two being in the main casting 10 and the former, 16, in an auxiliary casting which is bolted to the forward end of the main casting 10.

A worm screw 19 is mounted on the crank shaft 15, by which it is driven, the bearing 18, which is a ball bearing of the usual or desired construction, suitably supported and inclosed in a cylindrical projection of casting 10 at this point, taking the end thrust of said shaft due to said worm. This worm meshes with a worm wheel 20 which is keyed or otherwise secured to a sleeve 21 (see also Fig. 5) mounted on the axle-shaft 11 and normally free to rotate thereon. The operation of the engine, therefore, serves, through the medium of the crank shaft and worm gearing, to drive said sleeve, the sleeve of course being driven at much less speed than the speed of the engine, the speed ratio between the crank shaft and the sleeve being about 65 to 1 in the particular instance shown. This simple arrangement permits the necessary speed reduction between the engine and driving axle of the machine, without complication and expensive trains of spur gearing. In order to connect said sleeve with the axle or drive shaft 11, when desired, for the purpose of propelling the tractor, the sleeve 21 has secured thereto outside the casting 10 one member 22 of a clutch, while the axle-shaft 11 has secured thereto the other coöperating member 23 of said clutch.

As shown particularly in Fig. 7, the member 22 is provided with a pair of clutch members 24 adapted when thrust outwardly to frictionally engage the inner face of the overhanging flange of the member 23 and thereby to connect the two parts rotatively together. A clutch sleeve 25 sliding longitudinally on the hub of the member 22 and on the outside of the adjacent bearing formed on the casting 10, is connected by adjustable thrust rods 26 with said pair of clutch members 24. A lever 27 pivoted on a supporting bracket extending from the adjacent part of said casting 10 and having a fork engaging the groove in the sleeve 25, serves when operated to shift said sleeve back and forth and to cause said clutch members 22 and 23 to engage and disengage each other. This clutch, as will be explained, is operated from one of the steering handles of the machine. Any desired type of clutch may be employed in place of the particular clutch described. The traction wheels 28 are mounted on opposite ends of said axle-shaft 11 and are driven thereby to propel the machine. It will be seen that when the clutch is disengaged, the axle with only its clutch member 23 and the tractor wheels, is free to rotate independently of the engine and transmission gearing, so that the device is easily pulled around by hand, which could not be done if the clutch were, for instance, between the engine and transmission. As is seen more clearly in this Fig. 5, the main casting 10 has enlarged bearings 10ª, 10ª in this sleeve 21 which surround the axle-shaft 11, one such bearing on either side of that part of the casting which incloses the worm wheel 20, the space between the inside of such cast bearings and the sleeve being preferably filled with Babbitt or other desired metal forming a good journal.

The bearing 16 of the crank shaft, as above stated, is formed in an auxiliary casting 29 which is bolted on the forward end of the main casting 10, over the opening therein through which the crank shaft 14 is inserted in assembling the machine. This casting serves also as a bearing for one end of the valve cam shaft 30 (Fig. 3), which shaft is driven at half the speed of the crank shaft by suitable pinions 31 and 32 on the crank and cam shafts respectively. The valve stems which are operated by the cams on this shaft are indicated in Fig. 3 by numerals 33 and 34, one for the intake and the other for the exhaust valve, these parts not being shown in detail as they are old and well known. This cam shaft is continued on through suitable bearings in the main casting 10 and into a governor casing 35, which is suitably supported from the main casting 10 and contains a ball or other centrifugal governor 35ª of any desired type, as indicated in Fig. 3; thence said shaft extends to a suitable timer or igniter 36 by which the electric ignition circuit of the engine is properly controlled. These features also are not shown in detail, as they specifically form no part of the invention and are well understood by those skilled in the art. The centrifugal governor controls the lever 37, which is connected with the throttle of the carbureter, as by the rod 38, by which the speed of the engine may be maintained practically constant according to the adjustment, in a manner well understood. The throttle is likewise controlled from one of the steering handles, as before mentioned, to enable the operator while in that position to vary the speed as desired.

In a machine of this character I prefer to employ an air-cooled engine. For this purpose, the exterior of the cylinder casting is provided with heat radiating ribs or flanges 39, as indicated in Fig. 3, while provision is made to cause the air to circulate rapidly around and between them. For that purpose the auxiliary casting 29 heretofore described has its outer face cored out to form a circular depression around the bearing 16 and that of the cam shaft. The circular edge surrounding said depression is in close proximity to the inner edge 40 of the rim of the fly wheel 50, as shown, and forms therewith practically an air-tight joint. The fly wheel is mounted on the tapered end 51 of the crank shaft 15 and secured in any desired manner. The fly wheel is provided with openings or passages 52 in its rim slightly inclined to the radial, whereby said fly wheel acts as a suction fan when rapidly rotated. The depression in the face of the casting 29 is connected by a passage 41 extending therefrom to the upper face of said casting, and to this face is bolted another hollow casting 53 extending up alongside the cylinder 12 of the engine. The latter casting is open on the side toward the cylinder 12 so that the spaces between the radiating ribs communicate directly with the interior passage of the casting. A sheet metal casing 54 surrounds the remainder of said cylinder 12 in engagement with said radiating ribs with its edges abutting the edges of said casting 53. In the side of said casing 54 approximately opposite the casting 53 there is a vertical slot 55 designed to admit air to the spaces between the radiating ribs. This air inlet is wider at the upper end than at the bottom, to more freely admit the air toward the upper end of the cylinder where the greatest heat is present and the path the air must travel is longest.

It will be apparent from the above description that when the engine is running the fly wheel acts as a suction fan to draw the cool air through said opening 55 in the casing 54 and around and between said radiating fins or ribs 39, thence through the passage in the casting 53 and the passage and depression in the casting 29, and out through the openings in the rim of the fly wheel. This serves to keep the engine sufficiently cool in operation to prevent overheating, and renders unnecessary the more complicated, expensive and troublesome water cooling apparatus. Moreover this air cooling is accomplished without additional mechanism or moving parts and with only a few additional stationary pieces.

It will be noted, particularly in Fig. 3, that the crank 14 and the cam shaft gearing, as well as their associated parts, are all inclosed with the casting 10 by the web or wall 56 and the inner face of the auxiliary casting 29. For the purpose of oiling the parts within this crank case and associated therewith, I provide the cam shaft 30 with a suitable sprocket wheel 57 from which a sprocket chain 58 leads to a similar sprocket wheel 59 supported by the web 56 in the lower part of the crank case and beneath the level of the oil in said case when the machine is in running condition. When the engine is running, this chain will be operated rapidly and will carry the oil up from the lower part of the crank case and throw it around the entire inside of said case. This will serve to oil the cylinder of the engine, the valve cams and stems, and the various bearings of the cam and crank shafts, suitable oiling passages or apertures being formed in the walls of the castings to conduct the oil from the inside surfaces of the castings to the bearings, as indicated in the drawings. The worm gearing is likewise inclosed in a chamber formed by the main casting 10, and a lower inclosing casting 60 bolted thereon, and provision is made for filling said chamber with grease or other lubricant through the plug 61 in the upper side of said chamber. A similar means is provided for lubricating the governor in the casing 35.

For the purpose of steering and controlling the machine, a pair of hadle bars in the form of small channel iron or steel are secured at their inner ends by suitable bolts 71 to the main casting 10 and by a brace 72 extending between said handle bars and having a split collar 73 adapted to slip over the cylindrical extension of the main casting 10 which forms a support for the ball bearing of the crank shaft 15, said split collar being clamped in position by a bolt 74. The handle bars are thus rigidly secured to the main casting 10. The handle bars are further braced together by the cross braces 75 and 76, thus forming a rigid construction. These steering handle bars are provided with gripping handles 77 at their rear ends, constructed and secured in position in any desired way.

Adjacent the right handle is a throttle button or knob 78 connected by the rod 79 secured by clips to and running along the corresponding handle bar 70, and connected at its inner end by link 80 to said governor lever 37, and thence to the throttle of the carbureter. Thus the operator is enabled while retaining his grasp on the handle 77 to control the throttle.

The opposite handle 77, that is, the one on the left, is mounted on the end of the rod or shaft 81 extending along the outer side of said handle bar between its two flanges. This rod or shaft 81 is rotatable and at its inner end is connected by arm 82 and link 83 (Fig. 5) with the clutch-operating lever 27. Thus by rotating the handle 77 the clutch is thrown into and out of operation. A projection 84 on said clutch-operating handle 77 may be grasped to operate said clutch if a greater leverage is needed.

As before stated, the tractor thus constructed is adapted to receive any desired form of cultivator or other implement within the limits of its capacity. The particular cultivator shown is of a type in common use. It comprises a framework of horizontal members 90 to which the various shovels or plows 91 are attached, the side members being adjustable as to distance apart by the cross braces 92 and the lever mechanism 93. A pair of handles 94 is suitably connected with the frame of the cultivator. In order to attach said cultivator to the tractor, it is sufficient to connect the handles 94 of the cultivator by suitable links 95, one for each handle 94, depending from the cross-brace 76 of the tractor handle bars. Holes are provided in said links to adjust the height of attachment, a pin or bolt passing through a hole in the link and in the handle serving as the attaching means.

On the cross-brace 75 of the steering handles of the tractor I provide a lifting lever 96 having a link 97 reaching down to and connected with the forward part of the cultivator frame. By this means the cultivator may be lifted bodily above the ground and its depth of cultivation regulated.

The cultivator is drawn forward by the links 100 (Figs. 1 and 4) connected by a pin or bolt to the clevis at the forward end of the cultivator, said links in turn being bolted at their forward ends to the projecting members 101 of the lower casting 60 which is secured to said main casting 10 beneath the worm wheel (see also Fig. 3).

It is evident that the cultivator is thus attached with its forward end centrally between the wheels and its forward shovels or points substantially beneath the axle. This has the advantage that when the tractor is provided with or has attached thereto a cultivator of the type adapted to straddle and cultivate on both sides of a row of cotton, corn, etc., the shovels or points nearest the row, one or more on each side, are beneath the center of the axle, and the steering handles can be swung to one side or the other to steer the machine, without danger of plowing up or otherwise injuring the plants in the row. Were such shovels placed farther back, difficulty in this respect would be encountered in steering.

In order to adapt the machine to different widths of rows or for other purposes, the tractor wheels are adjustable back and forth on the end of the axle. Thus as shown at the right in Fig. 3 and in Fig. 6, the axle 11 is provided with a key slot and the hub of the wheel 28 is similarly provided. A key slidable in said slot with a set screw 103 to lock the same and the hub in position affords a ready means for adjusting the wheel in any desired position. Both wheels are constructed alike. As shown also in these figures, either tractor wheel 28 may be rotated forwardly without turning the axle or the other wheel. The hub 102 carries suitable dogs 104, outwardly spring-pressed to engage the notches in the periphery of the recess in the wheel proper. Thus either wheel can turn forwardly independently of the other, and the machine therefore may be readily turned around or otherwise handled.

For the purpose of using the engine for stationary power purposes, which may be desirable for running various kinds of machinery about the farm, I provide the said engine with two belt pulleys which may be utilized in any such way. One of these pulleys 105 is placed forward of the fly wheel and is preferably cast integral therewith, as indicated in Fig. 3. It is driven at the speed of the engine and therefore can be used for high speed work. The other belt pulley, 106, is secured to the end of the sleeve 21 opposite the clutch 22—23 (see Fig. 5), said belt pulley operating at a much slower speed than the engine shaft, as explained before.

Any suitable crank, such as that designated 107, may be furnished to start the engine. A tank 108 for gasolene is conveniently mounted on the handle bar frame, a slight distance from the cylinder, the carbureter being located therebetween. The details of the engine valves, the intake, exhaust and ignition apparatus and similar parts are not shown as they form no part specifically of my invention.

From the foregoing description the operation will be readily understood. The bearings of the working parts are all carried on or permanently connected with a single integral casting, thereby making a unitary structure which is strong and durable and not liable to derangement. The bearings are all housed and running in oil. The engine and transmission are mounted together as a complete unit, thus avoiding complication and derangement of parts. There are no universal joints or complicated trains of gears. The clutch being between the reducing gear and the transmision, permits ready hand manipulation of the machine, which otherwise would be difficult, if not impossible. The clutch as well as the throttle is controlled from the steering handle, thereby giving full control to the driver. The engine is kept cool, without complicated and troublesome mechanism. Any desired cultivating tool, or like device, may be utilized without substantial change. The wheels may be adjusted to different distances apart.

In addition, the parts are so positioned that the driving torque of the engine tends to be balanced by the weight of the engine and other parts in advance of the axle. So also is the cultivator so attached below the axle that the pull thereof when cultivating is added to the weight of the engine in tending to balance the driving torque or turning movement of the engine. Thus this extra weight or lift due to this torque and the weight of the parts is not thrown on the operator, and he is enabled to handle the machine with less effort.

Various other advantages will be apparent to those skilled in the art.

While I have shown but one embodiment of my invention, I would have it understood that it may be embodied in various forms, all within the scope of the appended claims.

Having thus described my invention, what I claim as new and desire to secure by Letters Patent is—

1. In a tractor, the combination with traction wheels, a single axle operatively connected with each of said wheels, a sleeve journaled on said axle, clutch members connected respectively with said axle and sleeve together with means for throwing said members out of driving relation with each other regardless of the direction of travel of said tractor, and a motor carried by the tractor and operatively connected with said sleeve.

2. In a tractor, the combination with traction wheels, of a single axle operatively connected with each of said wheels, a sleeve journaled throughout its entire length on said axle, clutch members connected respectively with said sleeve and axle together with means for throwing said clutch members into and out of driving relation with each other regardless of the direction of travel of said tractor, a worm wheel connected with said sleeve, and a motor driven worm in mesh with said wheel.

3. In a tractor, the combination with a driving axle, a sleeve mounted thereon, a clutch between the axle and sleeve, a casting also having a bearing on said sleeve, an engine cylinder connected with said casting, a crank shaft for said engine cylinder, and worm gearing between said sleeve and crank shaft, all supported upon and inclosed by said casting.

4. In a tractor, a pair of traction wheels, an axle therebetween, a sleeve on said axle, a clutch for connecting said sleeve and axle, an engine and its crank shaft, transmission gearing between said shaft and sleeve, the proportion of the gearing being such as to drive the sleeve at a slower speed than the speed of the shaft, and a pair of belt wheels for stationary power work, one connected directly with said shaft and the other with said sleeve.

In witness whereof, I have hereunto subscribed my name in the presence of two witnesses.

TRUMAN B. FUNK.

Witnesses:
MELVIN J. ABBOTT,
ROY BUCKLEY.